US005636436A

United States Patent [19]

Martin

[11] Patent Number: 5,636,436

[45] Date of Patent: Jun. 10, 1997

[54] EXTENDED COAXIAL CABLE EJECTION DEVICE

[76] Inventor: Douglas A. Martin, 4920 Schalk Rd., #1, Miller, Md. 21107

[21] Appl. No.: 365,445

[22] Filed: Dec. 28, 1994

[51] Int. Cl.[6] .......... B23P 19/00

[52] U.S. Cl. .......... 29/764; 29/235

[58] Field of Search .......... 29/758, 764, 235, 29/272

[56] References Cited

U.S. PATENT DOCUMENTS

| | | | |
|---|---|---|---|
| 2,976,608 | 3/1961 | Busler . | |
| 3,075,283 | 1/1963 | Jansch . | |
| 3,136,040 | 6/1964 | Bauer . | |
| 3,137,062 | 6/1964 | Breon et al. . | |
| 3,149,413 | 9/1964 | Baskell | 29/235 |
| 3,222,766 | 12/1965 | Camargo | 29/764 |
| 3,369,286 | 2/1968 | Marshall | 29/235 |
| 3,380,141 | 4/1968 | Rofer . | |
| 3,588,983 | 6/1971 | Hoy . | |
| 3,600,784 | 8/1971 | Propst et al. . | |
| 3,624,887 | 12/1971 | Hilbert | 29/764 |
| 3,666,311 | 5/1972 | McMullin . | |
| 3,672,024 | 6/1972 | Barr . | |
| 3,698,058 | 10/1972 | Reimer et al. | 29/764 |
| 3,802,049 | 4/1974 | Hennessey . | |
| 3,840,969 | 10/1974 | Landis . | |
| 3,871,057 | 3/1975 | Moulin . | |
| 4,205,435 | 6/1980 | Holt | 29/235 |
| 4,663,838 | 5/1987 | Dewey et al. . | |
| 4,765,049 | 8/1988 | Lundquist | 29/235 |
| 4,807,343 | 2/1989 | Wadsworth | 29/235 |
| 5,040,289 | 8/1991 | Flaynik | 29/764 |

*Primary Examiner*—P. W. Echols

*Attorney, Agent, or Firm*—Richard M. McMahon; Scally, Scally & McMahon, P.A.

[57] ABSTRACT

This invention relates to an apparatus or device for use in ejecting coaxial cable from the connector block cavity located on a cellular telephone circuit pack to remove the specific faulty coaxial cable. This invention pertains to the method of ejection of the coaxial cable from the front side of the cellular telephone circuit panel with the coaxial cable plugged into the connector block cavity located on the back plane of the cellular telephone circuit pack cabinet. The Extended Coaxial Cable Ejection Device is inserted from the front of the cellular telephone circuit panel cabinet into the connector block located on the back plane of the cellular telephone circuit pack of the specific coaxial cable to be removed. The hollow outer ejector tip of the Extended Coaxial Cable Ejection Device is inserted over the tip of the coaxial cable engaging the coaxial cable snap ring. A slight forward pressure is applied to the apparatus to collapse the coaxial cable snap ring in the connector block cavity. The inner ejector tip of the Extended Coaxial Cable Ejection Device is extended beyond the hollow outer extractor tip to the forward position releasing the faulty coaxial cable from the connector block cavity. The faulty coaxial cable is removed from the rear of the cellular telephone circuit pack cabinet.

10 Claims, 4 Drawing Sheets

EXTENDED COAXIAL CABLE EJECTION DEVICE

BACKGROUND OF THE INVENTION

This invention relates in general to a coaxial cable connector assembly, and more particularly, to a removal tool for removing a coaxial cable connection from a telecommunications circuit cell panel from the front side of the circuit cell panel wherein the technician does not have to reach inside the coaxial cable cabinet to remove the telecommunications coaxial cable from the cable connector block located on the back plane of the circuit cell panel.

Small or mini-coaxial cables are used extensively in cellular telephone applications. Various manufacturers of cellular telephone equipment utilize radio frequency mini-coaxial cables with the coaxial cable connector blocks assembled in circuit packs in a cell site cabinet. A cellular telephone site will have one or more cell site cabinets.

The current procedure requires the removal of as many as five or six functioning circuit packs, to allow for the servicing technician to fit his arm and hand in an opening between the circuit packs to reach the coaxial cable tips exposed on the back plane of the cellular site panel and removal with various types of "make do" tools. Removal of a functioning circuit pack to service a faulty coaxial cable in another circuit pack results in multiple cellular telephone circuits being taken out of service to enable repairs to be accomplished. This results in lost revenue from each functioning circuit pack so removed as it takes approximately 1/10th of an hour or 6–7 minutes per circuit pack for removal and reinstallation of each circuit pack. Servicing a cellular cell panel cabinet in this manner requires the system be shutdown for approximately 50–60 minutes for the overall procedure. Peak daytime demands of a cellular telephone system result in such maintenance work being done during offpeak hours and at night in order to minimize revenue losses.

Attempts have been made to provide a coaxial cable removal tool that is inserted directly into the circuit pack connector block to remove the faulty minicoaxial cable. This type of apparatus is unsatisfactory as it requires the removal of as many as six functioning circuit packs with a shutdown time of 30–50 minutes to service a cell with a faulty cable. The technician is also subject to the possibility of physical injury because he has to reach his arm and hand into the working circuitry area to perform this service. Circuit packs and the associated support equipment have many sharp edges and protrusions which often results in scrapes and cuts to the technician's arm or hand while performing this service.

An object of this invention is to minimize the total shutdown time of the cell to less than 15 minutes to replace faulty coaxial cables by removal of only two circuit packs and to make the removal of such faulty coaxial cables simple and easy.

Another object of this invention is to reduce the possibility of physical injury to the service technician when servicing a cell panel. The Extended Coaxial Cable Ejection Device does not require the technician to reach between the cells to reach the cable connector block located on the back plane of the circuit cell panel.

A further object of this invention is to minimize the possibility of electrical shock to the technician or electrical shorts to the equipment. Most cellular telephone installations operate with a relatively low voltage electrical power source. However, the insulation feature of the present invention reduces the possibility of either shocks or electrical shorts.

Historically, various techniques and attempts have been made to remove electrical connector contacts or clips from connector blocks, cavities, and panels. One known technology is disclosed in U.S. Pat. No. 2,976,608 issued to Bustler for a Taper Pin Extracting Tool. This technology relates only to taper pin electrical connectors and extraction from electrical receptacles, and which such taper pin connectors are not used with coaxial cable connections in cellular telephone applications.

Another type of electrical connection and ejection tool is disclosed in U.S. Pat. No. 3,075,283 issued to Jansch which relates generally to tools and more particularly to a tool for ejecting snap-on type of an electrical contact pin from a multiple connector. This type of electrical connector is not used with coaxial cable connections in cellular telephone applications.

A variation in the above described tapered pin electrical connection is described in U.S. Pat. No. 3,136,040 issued to Bauer and Galneder. Such tapered pin connectors are not used with coaxial cable connectors in the cellular telecommunication applications.

Other electrical contacts and tools for manipulating such contact elements are described in U.S. Pat. No. 3,137,062 issued to Green et al, U.S. Pat. No. 3,380,141 issued to Roofer, U.S. Pat. No. 3,588,983 issued to Hoy, U.S. Pat. No. 3,871,057 issued to Moulin and U.S. Pat. No. 4,663,838 issued to Dewey et al describe other types of electrical wire connector insertion and removal devices for connector blocks and connector types which are not used with coaxial cable connections in cellular telephone applications.

U.S. Pat. No. 3,672,024 issued to Barr describes a contact clip extraction tool used in connection with a contact clip that is releasably lockable in a bore within an electrical connector block. Practicing the method of this patent requires removal of the contact clip from the front plane of the connector block assembly by pulling on the device. This patent utilizes a rear insertable clip removal tool which removes the clip from the connector assembly from the rear thereof. The present invention removes the retaining ring or clip from the front thereof. The type of clip disclosed by Barr is not utilized in mini-coaxial cable or cellular telephone applications.

U.S. Pat. No. 3,802,049 issued to Hennessey discloses a tool for removing, from an electrical connector assembly, electrical contacts that are not attached to a wire or have their wire receiving well filled with solder. Such connectors are not used with coaxial cable connectors in cellular telephone applications.

The advantages of this invention and mode of operation will be readily appreciated as the same becomes better understood by reference to the following detailed description when considered in connection with the accompanying drawings.

SUMMARY OF THE INVENTION

In accordance with the invention, a Coaxial Cable Ejection Device for use in connection with a coaxial cable with a coaxial cable snap ring that is releasably lockable in a coaxial cable connector cavity with a circuit panel comprising a solid push rod with a means to attach a knob and is inserted through a hollow tube body having a larger diameter internal cavity with a means for attaching a solid cable ejection tip comprising the inner ejection assembly, which is held in slidable position in the tube body by the outer ejection tip which has the means to attach to the body.

BRIEF DESCRIPTION OF THE DRAWINGS

FIG. 1A is a perspective view of another embodiment of the Extended Coaxial Cable Ejection Device.

DETAILED DESCRIPTION

Figure 1:
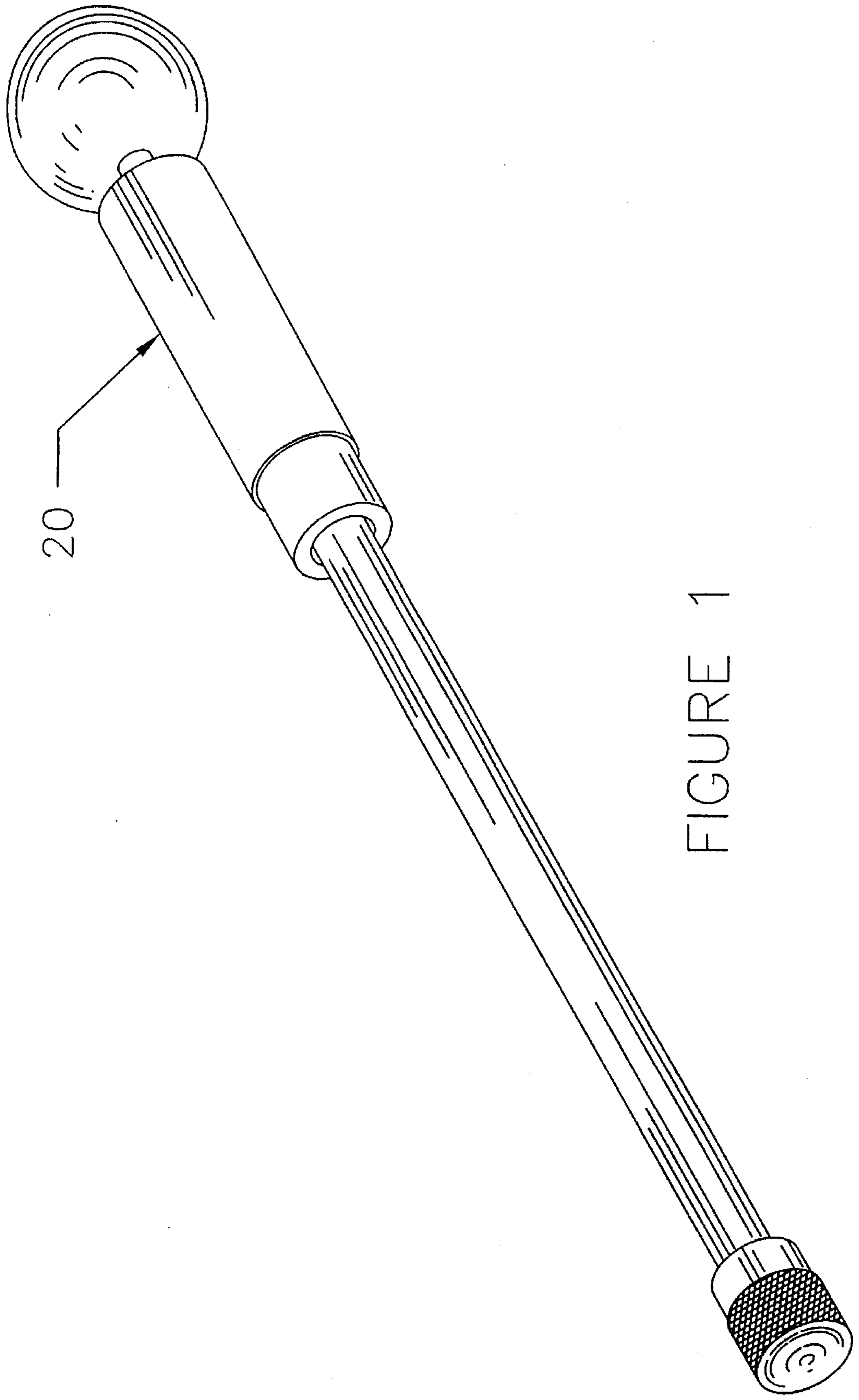
FIG. 1 is a perspective view of preferred embodiment of the Extended Coaxial Cable Ejection Device.

Referring to the drawings for a better understanding of the present invention, this invention is susceptible to embodiment in many different forms, the description which follows should be viewed as an illustration of the principles of the invention and is not intended to limit this invention to the two specific embodiments illustrated in the drawings.

FIG. 1 is a preferred embodiment of the Extended Coaxial Cable Ejection Device showing the tool in the extended form for comparison with a shorter form depicted in FIG. 1A. The variation in these devices is the length of the outer tubular body and the corresponding length of the slidable inner ejection assembly. The Extended Coaxial Cable Ejection Device shown in FIG. 1 is of a length slightly longer than the depth of a standard cellular telephone cell pack cabinet which corresponds to the front to back depth of the specific telecommunications circuit pack cabinet in use, with most cellular telephone cabinets being of a singular standard depth.

FIG. 1A shows the coaxial cable extraction device in a shorter form with a shorter hollow tube body and a shorter solid push rod. This embodiment consists of a solid tubular push rod 30 which is threaded into a non-conductive ball knob 31 at one end and this assembly is inserted through a hollow tube body 32 having a larger diameter internal cavity into Threads 33 and is threaded into Solid Ejection Tip 38 comprising the inner Ejection Assembly 50. The Inner Cable Ejection Assembly 50 is held in slidable position in the tube body 32 by the tubular outer ejection tip 34 which is threaded into the Tube Body 32 at the end opposite the Ball Knob 31. The Tube Body 32 is wrapped or coated with an electrical insulating material 41 to prevent electrical contact while using the device to remove coaxial cables from telecommunications panels. A non-conductive tubular handle 35 is affixed by an interference fit to the hollow tube body 32 at the end near the ball knob 31 of the device to more easily grip and hold the device by hand. A removable protective cap 36 is threaded to the tube body 32 over the inner and outer ejection tips to protect the tips when the device is not being used. This device can be used for removal of mini-coaxial cable where the depth of the circuit pack cabinet is extremely short or in deeper cabinets, but removal of multiple circuit packs is required to reach the rear of the cabinet. A longer extended coaxial cable ejection device is intended to be within the scope of this disclosure.

Inner ejection tip 38 is extended beyond the outer Ejection Tip 34 by pushing the ball knob to the forward position. The inner solid ejection tip 38 is retracted inside the Tubular Outer Ejection Tip 34 by retracted inside the pulling the ball knob to the rear position which slides the inner ejection assembly 50 to the rear.

The operation of the invention is described as follows:

After removal of the protective cap 36, the extended cable ejection device is inserted into the connector block cavity 40 of the specific coaxial cable 60 to be removed. The hollow Outer Ejection Tip 34 is inserted over the tip 80 of the coaxial cable engaging coaxial cable snap ring 70. A slight forward pressure is applied to the device to collapse the coaxial cable snap ring 70 in the connector block cavity 40. While the device is still engaged on the coaxial cable tip 80, the Ball Knob 31 of the device is pushed forward releasing the faulty coaxial cable 60 from the connector block cavity 40 for removal of the coaxial cable 60 from the rear of the panel.

Figure 2:
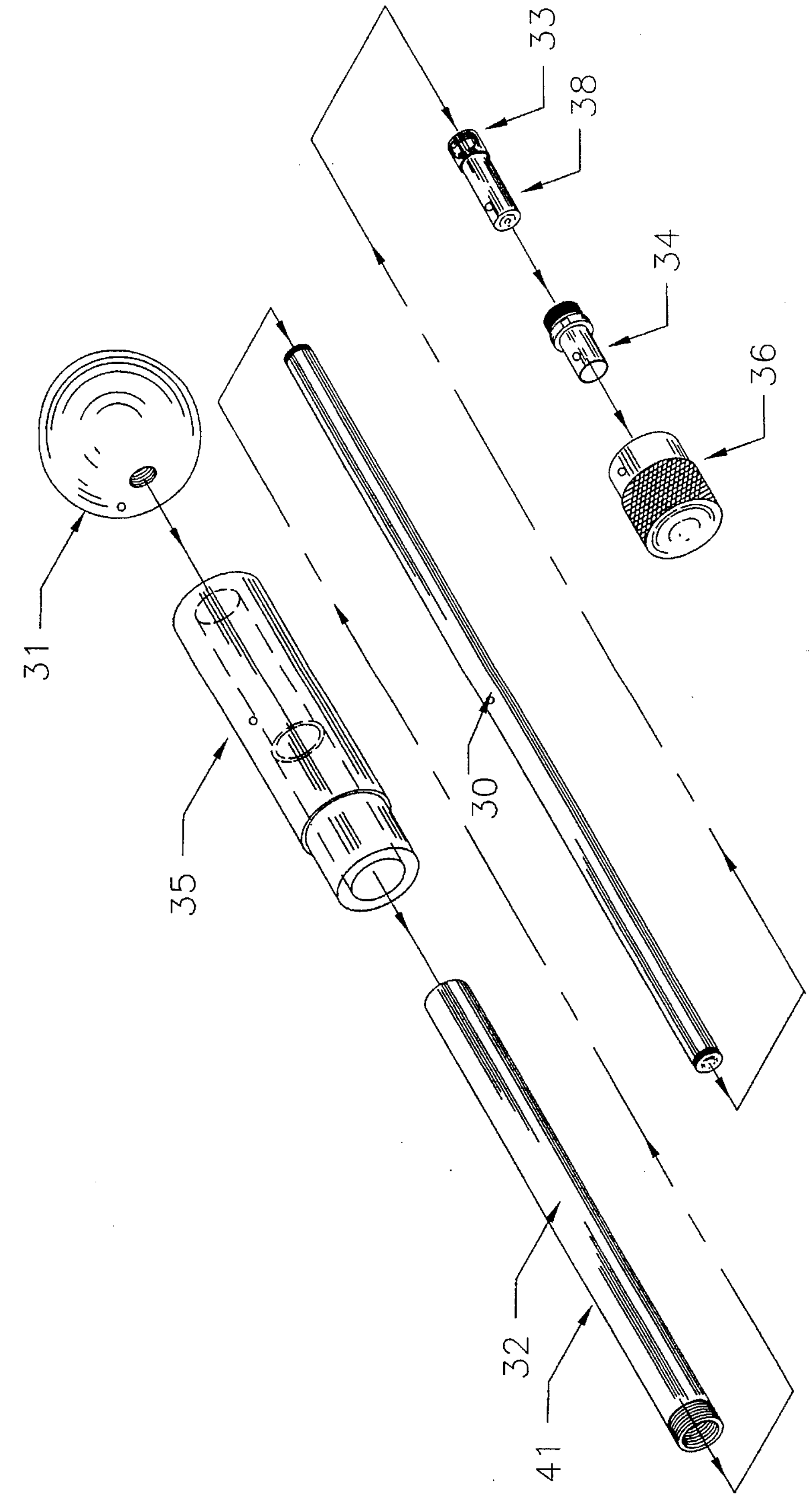
FIG. 2 is an exploded view of the preferred embodiment of the Extended Coaxial Cable Ejection Device as shown in FIG. 1.

Referring now to FIG. 2 showing the exploded view of the preferred embodiment of the subject apparatus device 20. The device 20 comprises a solid tubular push rod 30 which is directed into a non-conductive ball knob 31 at one end and this assembly is inserted through a hollow tube body 32 having a larger diameter internal cavity into Threads 33 and is threaded into inner cable ejection tip 38 at the end opposite the Ball Knob 31 comprising inner ejection assembly 50. Tube body 32 is threaded to hollow outer ejection tip 34. The inner ejection assembly 50 held in slidable position in the tube body 32 by the tubular outer ejection tip 34 which is threaded into the tube body 32 at the end opposite the ball knob 31. The tube body 32 is wrapped or coated with an electrical insulating material 41 to prevent electrical contact while using the device 20 to remove coaxial cables 60 from telecommunication panels.

A non-conductive tubular handle 35 is affixed by an interference fit to the hollow tube body 32 at the end near the ball knob 31 of the device 20 to more easily grip and hold the device by hand. A removable protective cap 36 is threaded to the hollow tube body 32 over the inner and outer ejection tips to protect the tips of the device when the device is not being used.

Figure 3:
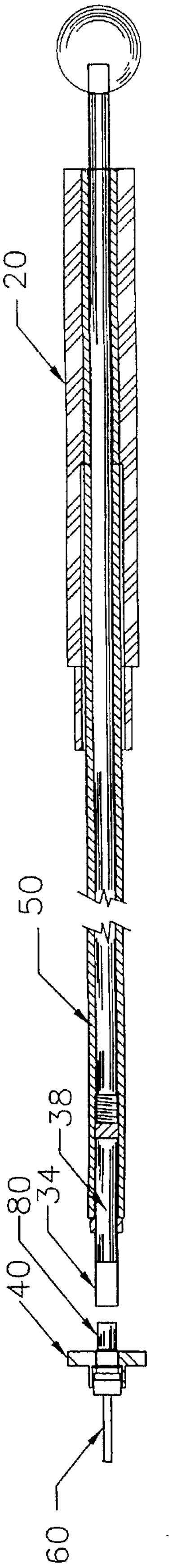
FIGS. 3, 4, and 5 are enlarged longitudinal sectional views showing successive conditions of the device in the process of ejecting the coaxial cable from the connector block cavity.
Figure 4:
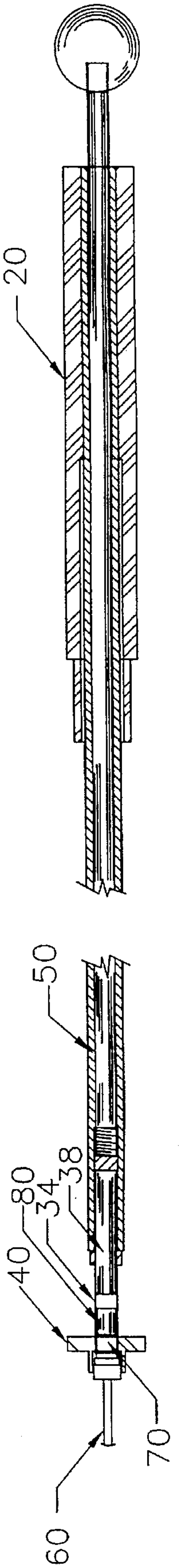
Figure 5:
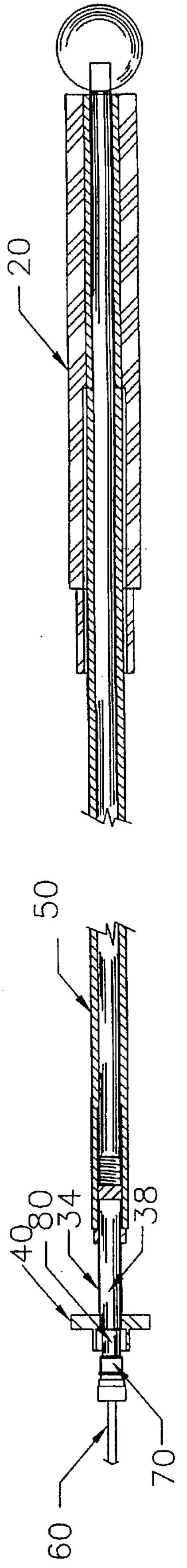

The inner ejection tip 38 is extended beyond the outer ejection tip 34 to the forward position as shown in FIG. 5. The inner ejection tip 38 is retracted inside the outer ejection tip 34 as shown in FIG. 3 by pulling the ball knob 31 to the rear position as shown in FIG. 4 which slides the inner ejection assembly 50 to the rear.

Referring again to FIGS. 3, 4, and 5, a typical coaxial cable assembly construction is depicted in the partial sectional view with a coaxial cable Tip 80 in a connector block cavity 40. The coaxial Cable Tip 80 is affixed to the coaxial cable 60 to electrically connect this male tip coaxial cable connector assembly to the cellular telephone circuitry.

Figure 6:
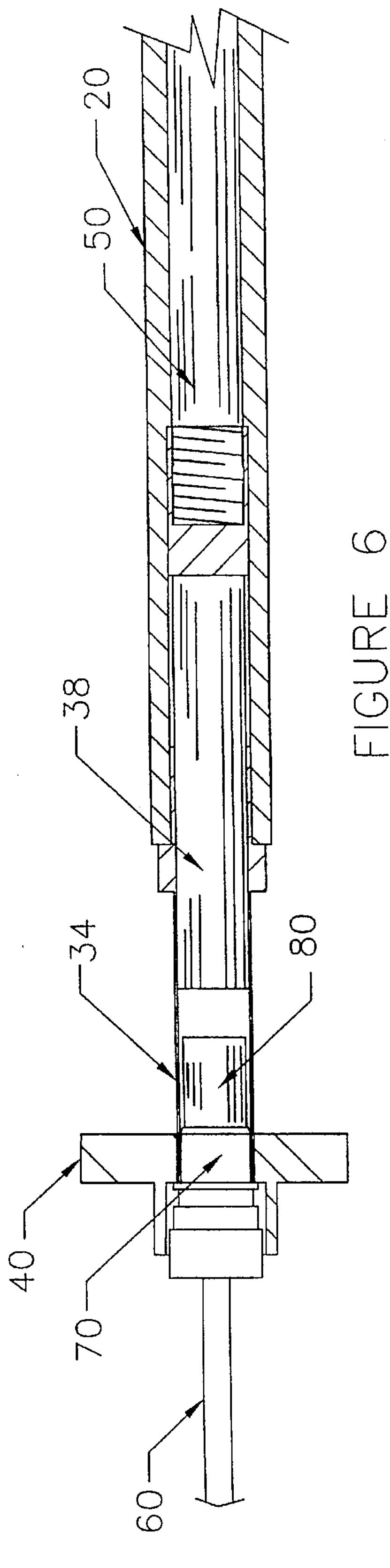
FIGS. 6 and 7 are schematic representations illustrating the operative functions of the Extended Coaxial Cable Ejection Device.
Figure 7:
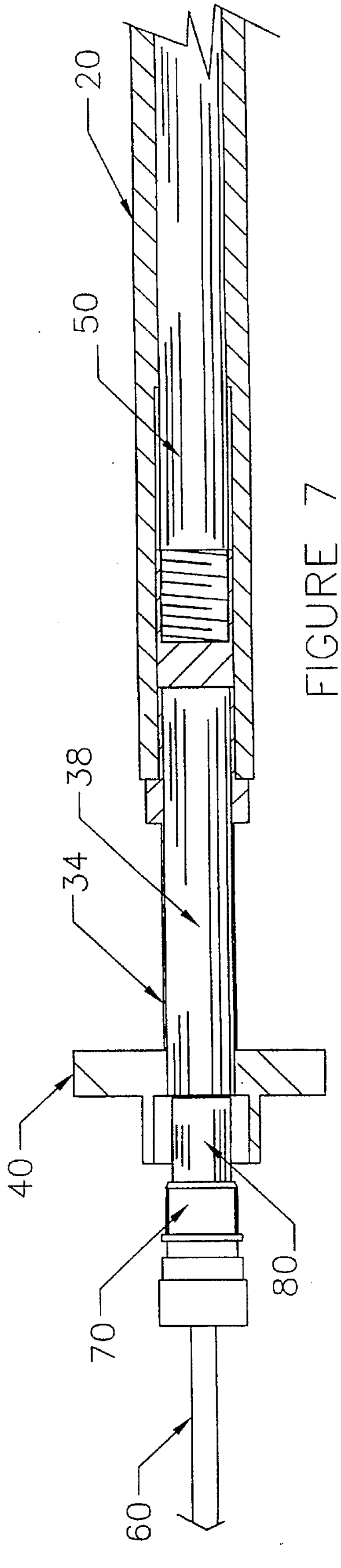

Operation of this invention is described as follows: After removal of protective cap 36, the Extended Coaxial Cable Ejection Device 20 is inserted into the connector block cavity 40 as shown in FIG. 3 of the specific coaxial Cable 60 to be removed. The hollow outer ejection tip 34 is inserted over the Tip 80 of the Coaxial Cable 60 engaging the coaxial cable snap ring 70 as shown in FIG. 4. A slight forward pressure is applied to the device to collapse the coaxial snap ring 70 in the connector block cavity 40 as shown in FIG. 6. While the device is still engaged on the coaxial Cable tip 80, the ball knob 31 of the device is pushed forward releasing the faulty coaxial cable 60 from the connector block cavity 40 for removal of the coaxial Cable 60 from the rear of the panel as seen in FIG. 7.

Operation of this invention in alternate embodiments as depicted in FIG. 1A is precisely the same as described herein with varying lengths of the hollow tube body 32 and a matching length of push rod 30.

What is claimed as new and the inventor desires to secure by Letters of Patent of the United States is:

1. A coaxial cable ejection device with a handle means for use with a coaxial cable snap ring that is releasably lockable in a coaxial cable connector cavity within a circuit panel comprising:

a solid tubular push rod held slidably in a hollow tube body having an inner diameter greater than the outer diameter of the solid push rod;

the push rod having a solid ejection tip attached at one end;

the tube body having a tubular outer ejection tip attached at the end proximate the end of the solid ejection tip on the push rod;

the tubular outer ejection tip limiting the sliding motion of the push rod in the direction away from the handle means.

2. A coaxial cable ejection device in accordance with claim 1 wherein the tube body is wrapped or coated with an electrical insulating material to prevent electrical contact when in use.

3. A coaxial cable ejection device in accordance with claim 1 with a removable protective cap threaded to the tube body.

4. A coaxial cable ejection device in accordance with claim 1 wherein the push rod, tube body, solid ejection tip and tubular outer ejection tip and a protective cap are made of metal material and the handle means is made of a non-conductive plastic material.

5. A coaxial cable ejection device in accordance with claim 1 wherein the device is made of non-conductive plastic material.

6. A coaxial cable ejection device with a handle means for use with a coaxial cable snap ring that is releasably lockable in a coaxial cable connector cavity within a circuit panel comprising:

a solid push rod held slidably in a hollow tube body having an inner diameter greater than the outer diameter of the solid push rod;

the push rod having a solid ejection tip attached at one end;

the tube body having a tubular outer ejection tip attached at the end proximate the end of the solid ejection tip on the push rod;

the tubular outer ejection tip limiting the sliding motion of the push rod in the direction away from the handle means; and the solid push rod and hollow tube body have a length greater than the depth of a telecommunications circuit panel cabinet.

7. A coaxial cable ejection device in accordance with claim 6 wherein the tube body is wrapped or coated with an electrical insulating material to prevent electrical contact when in use.

8. A to axial cable ejection device in accordance with claim 6 wherein there is a means for attaching a protective cap to the tube body.

9. A coaxial cable ejection device in accordance with claim 6 wherein the push rod, tube body, solid ejection tip and tubular outer ejection tip and a protective cap are made of metal material and the handle means is of a non-conductive plastic material.

10. A coaxial cable ejection in accordance with claim 6 wherein the device is made of a non-conductive plastic material.

* * * * *